United States Patent [19]

DeSantis

[11] 4,219,884
[45] Aug. 26, 1980

[54] APPARATUS FOR CONTROLLING INSECTS

[76] Inventor: Albert DeSantis, 7929 NW. 3rd Pl., Margate, Fla. 33063

[21] Appl. No.: 7,583

[22] Filed: Jan. 29, 1979

[51] Int. Cl.³ .............................................. H04B 1/02
[52] U.S. Cl. ...................................... 367/139; 43/124
[58] Field of Search ............................ 340/15, 384 E; 116/22 A; 43/124; 367/139

[56] References Cited

U.S. PATENT DOCUMENTS

| 3,872,472 | 3/1975 | Moschgat | 340/15 X |
| 3,891,962 | 6/1975 | White | 340/15 |
| 4,097,838 | 6/1978 | Fiala | 340/15 |
| 4,105,992 | 8/1978 | Luciano | 340/15 |

Primary Examiner—Theodore M. Blum

[57] ABSTRACT

Electromechanical apparatus producing random ultrasonic noise is disclosed for killing insects. A number of coils are provided, each having primary and secondary windings which are wrapped around a metal core. The windings are electrically interconnected to each other and to a power source. The current through the windings is controlled by a number of digital signals having random pulses and random intervals between pulses. The random pulses rapidly turn the current through the windings on and off. This causes the metal cores to vibrate extremely randomly thereby producing random noise.

12 Claims, 2 Drawing Figures

APPARATUS FOR CONTROLLING INSECTS

BACKGROUND OF THE INVENTION

1. Field of the Invention

This invention generally relates to apparatus for controlling insects and small rodents and more particularly to an electronic apparatus for killing insects and other harmful small rodents by the use of random high-frequency sound.

2. Description of the Prior Art

Insects and small rodents are responsible for vast amounts of damage in the world. The damage can be small such that individual rose bushes and other ornamental house plants or their roots are literally eaten up by insects. Indeed, lawns and even entire trees have succumbed to such damage by insects. Or, the damage can be so vast as to ruin or effectively diminish a nation's food output, causing shortages, rising prices or even, in some instances, starvation of human beings.

Even buildings are subject to extensive damage by such insects as termites.

Then too, animals and human beings are directly and adversely affected by insects. The damage can merely be inconvenience caused by insect bites such as mosquitos, flies, spiders, gnats, fleas, ants, scorpions, bees, wasps and the like. The list of such insect bites is almost limitless. The damage caused by such bites is not limited to mere inconvenience or annoyance as is the more common case. That malaria is transmitted to man by the bite of the anopheles mosquito is well documented as is the fact that such bites resulted in large numbers of deaths of human being during jungle fighting in World War II and the building of the Panama Canal.

Consider also the deaths of children who are allergic and whose deaths are caused by bites of insects and stings of bees. In such cases, the insect bites which would otherwise be a minor irritant to most persons are directly responsible for these deaths.

Secondary and equally devasting effects of insect bites are often the main cause of communicable or infectious diseases which have been known to kill, maim and otherwise injure vast populations of human beings and animals.

The full extent of the damage caused by insects has not and will probably never be completely measured and will never be fully understood or appreciated. The latter point is meant to be directed to phenomena such as lethal yellowing which has caused almost the complete destruction of various species of palm trees in the state of Florida, or the well-known disease of corn blight. Although it is not known for certain, it is highly suspected that insects may be responsible for the transmission of such diseases from tree to tree or plant to plant. Indeed, it is even possible that the diseases themselves may be caused by a form of life which may be broadly classified as an insect.

Modern medicine has fortunately minimized the effects of various insect bites and has served to stem or even stop the resulting diseases from being communicated or otherwise transmitted. But, modern medicine is merely attacking the symptom rather than eliminating the root cause of such diseases.

Combating insects has taken on varied forms, each with its own measure of success and secondary effects which in and of themselves are often harmful. One of the more crude forms of control include the ordinary and ubiquitous fly swatter. Its use is so wide spread that virtually no home is without one. In fact, they are often provided in each motel room with the name of the motel imprinted thereon so that when they are "taken as souvenirs", a certain degree of advertising is obtained. However, once a fly swatter is used, consider the result. The insect is killed, but the remains of the insect that are left partially on the fly swatter and partially at the location of the kill, such as the wall, desk, kitchen counter, dining room table, etc. Such a result is neither appetizing nor sanitary.

Some of the more sophisticated devices in use today include an electronic device which attracts insects and then proceeds to electrocute them. However, can it be said that this device rids the immediate area of insects or does it cause the attraction of insects to the immediate area?

Perhaps the most widely used method of control of insects today includes toxic chemicals. The advantages of such chemicals are readily apparent in that large areas may be quickly and effeciently sprayed by planes, truck-mounted sprayers and even by boats equpped with sprayers. Also, most of the chemicals are quite effective in killing the various insects. Unfortunately, the chemicals are known to kill such beneficial animals or fish and fowl. And, there is growing evidence that these chemicals are responsible for shortening the lives of human beings by causing cancer in human beings either by direct contact or by indirect contact. With indirect contact, such chemicals eventually find their way into the human body by first being absorbed in the soil or growing media of plant life, which is eaten by humans, or into fish, fowl, cattle, pigs, lamb, etc., which are included within a human's diet. In this regard, a draft report of a new government study indicates that fourteen percent (14%) of the dressed meat and poultry sold in supermarkets might illegally contain residues of chemicals suspected of causing cancer, birth defects or other toxic effects. Direct contact usually exposes the human respiratory system to the chemicals by breathing the air saturated with the chemicals.

In summary, there are methods of controlling insects, but the adverse effects of such methods or devices often outweigh their advantages. The recent ban of the use of the chemical known as DDT is one such example.

For some time now, it has been suspected and to some degree known, that all forms of animal life, including insects and small rodents, communicate by sound. Most often the communication is by ultrasonic sound which is imperceptible to the human auditory sense. This communication is directly related to reproduction cycles, including mating and protection of the newborn, eating, sleeping, protecting boundries, avoiding enemies, finding food and enemies, and the like. Thus, ultrasonic communication by insects is not unlike the dependence of such communication by humans in order to propagate and preserve the species. The extent of such insect communication and their life dependence thereon is authoritatively shown in *Ultrasonic Communication by Animals* by Gillian Sales and David Pye, Chapman and Hall Ltd, 1974, Library of Congress Catalog Number 73-15213.

Since communication is essential to life functions and habits of insects, it follows that the disruption of this communication is detrimental to the same life functions and habits. Recent studies and research carried out by the University of Southern California at Berkeley have shown that the life cycles of insects can be adversely affected by disrupting their communications with ultrasonic sound. Apparently, the insects cannot then communicate and such ultrasonic sound creates a confusion to the extent that even the eating and sleeping habits of the insects are disrupted. Such ultrasonic sound ultimately results in the death of the insects. Studies at other universities have substantiated these effects. A more recent study at the University of Miami, as reported in the Miami Herald newspaper on or about Jan. 20, 1979, reaches the same conclusion as the studies at Berkeley.

The invention herein utilizes ultrasonic sound to kill insects and such effect has been demonstrated during prototype testing of the inventive apparatus.

Accordingly, it is an object of the invention to effectively and efficiently kill insects and small rodents within a given and controllable range.

Another object of the invention is to eliminate any harmful effects on human beings.

A further object of the invention is to eliminate any harmful effects on either ornamental plants or plants subsequently eaten by human beings.

A still further object of the invention is to prevent harm to domestic animals or animals whose flesh forms part of the diet of human beings.

An even further object of the invention is to prevent harm to the environment during or subsequent to its primary purpose of killing insects or small rodents.

BRIEF SUMMARY OF THE INVENTION

The present invention overcomes the problems of the prior art by providing electronic apparatus which generates random high-frequency sound which effectively kills insects and rodents within an effective range thereof and is not harmful to human beings.

The present invention accomplishes the above-stated objectives by providing apparatus which creates continuous but short duration random high-frequency sound by electronic means. The effect of such random sound upsets the living environment and causes disorientation of the insects to the extent that confusion results which disrupts the eating, reproduction and other living functions of the insects and ultimately causes their death.

The invention provides electronic apparatus which uniquely creates an increasing number of digital signals. The digital signals are then combined in a unique fashion, thereby reducing the overall number of signals but producing different digital signals having discrete pulses of varying duration and varying intervals between pulses. These random signals are then used to control the current flow to and from a number of uniquely interconnected transformer-like coils wound around a metal core.

When in operation, the current, through one or more of the windings of the coils, is instantaneously brought to zero causing the core material to vibrate and generate ultrasonic sound. During the decay of this sound which varies in frequency, random, instantaneous collapsing of the current through the other winding of the same coil continuously and randomly adds or subtracts to the main sound being produced by the core thereby resulting in the generation of ultrasonic sound having random frequencies of very short duration. By electronically combining the number of coils, and alternatively causing each of these to instantaneously produce random noise, the actual output noise is even more random. Such random noise is continued over a sufficient length of time to cause complete disorientation of the insects and small rodents within its effective range and ultimately cause their destruction. The invention summarily described has been shown to be most effective.

DESCRIPTION OF THE DRAWINGS

For a fuller understanding of the invention, reference is had to the following description taken in connection with the accompanying drawings in which.

DESCRIPTION OF THE PREFERRED EMBODIMENTS

Figure 1:
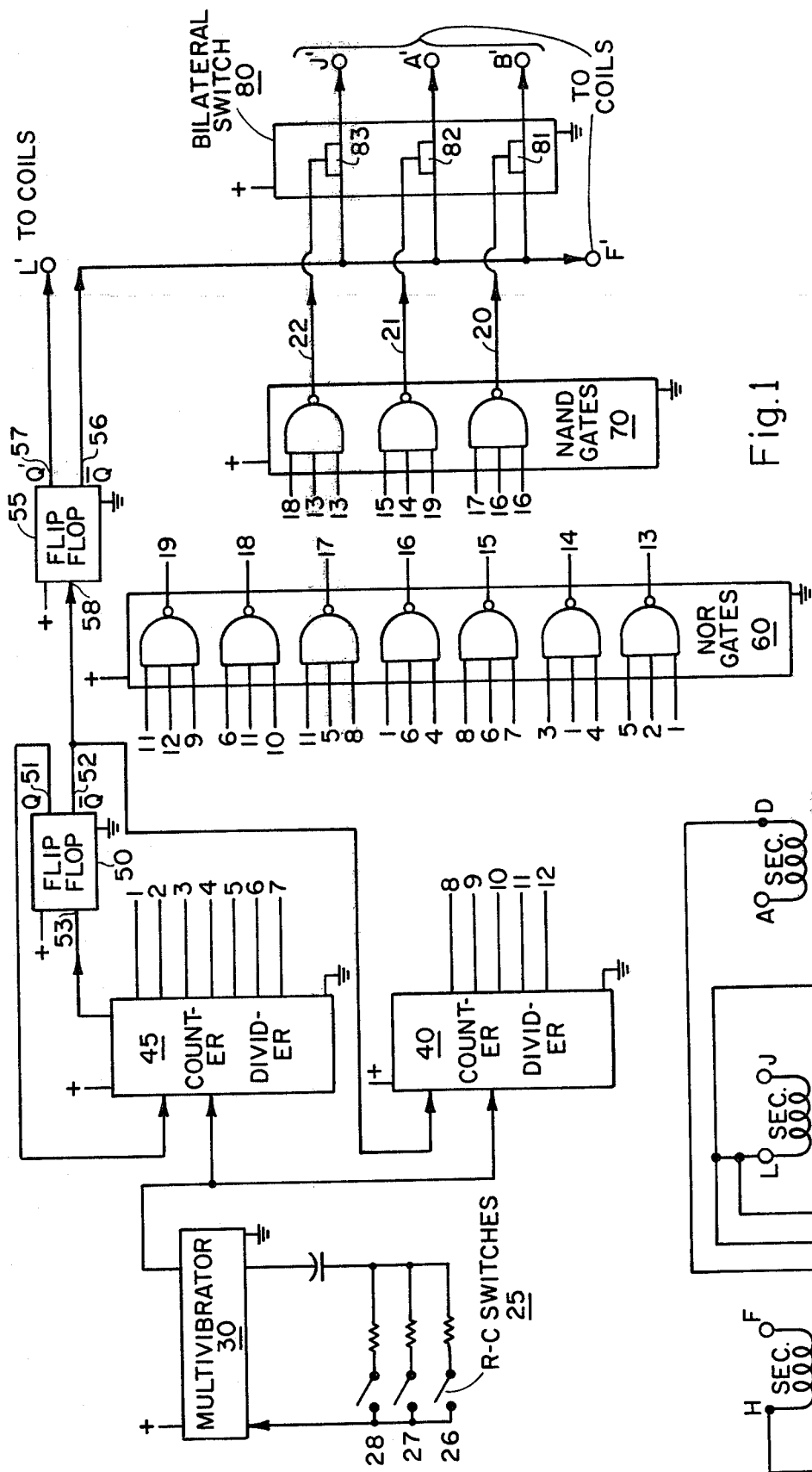
FIG. 1 is a circuit diagram of one embodiment of the invention illustrating the inventive logic-producing random signals to be input to noise-producing coils.
Figure 2:
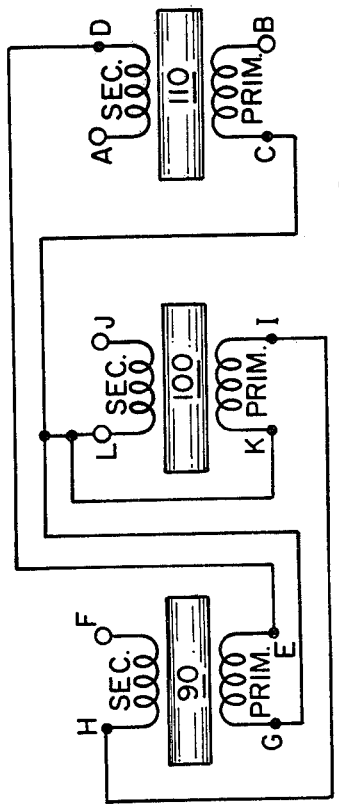
FIG. 2 is a schematic diagram of an arrangement of noise-producing coils which coils are used in conjunction with the output signals of FIG. 1.

Referring now to the drawings in detail, FIG. 1 is to be viewed in conjunction with FIG. 2, to the extent that the signals output from FIG. 1 are input to FIG. 2.

In FIG. 1, item 25 represents a number of switches comprising resistor capacitor networks.

The circuit represented by FIG. 1 is a dc circuit which is capable of operating at a low voltage, of the order of twelve volts. Each major component is shown as being connected to the supply voltage and to ground. In actuality, the supply voltage connection may be commonly connected as may be the ground connections. Although not shown, the power supplied to the circuit is preferably from a large 12 volt battery or a number of smaller 12 volt batteries connected in parallel. A power source, as described, provides for long life and portableness both of which are for purposes of convenience.

The major components of FIG. 1 will now be identified in order to provide a better understanding of the later discussion of the circuit operation and its logic. Item 25 represents a number of individually operable switches comprising resistor capacitor networks. A monostable-astable multivibrator is designated by the reference numeral 30. Items 40 and 45 comprise counter dividers with decoded outputs. Items 50 and 55 are flip flop integrated circuits. Item 60 comprises a number of NOR gate integrated circuits; while, item 70, comprises a number of NAND gate integrated circuits. Finally, item 80 is a bilateral switch containing a number of individual bilateral switches.

In FIG. 2, three transformer-like coils are schematically shown and designated by numerals 90, 100 and 110.

Referring again to FIG. 1, switch 25 contains three individual switches 26, 27 and 28. Each individual switch may be operated at any one time. In other words, because of the parallel arrangement, either switch 26, or 27 or 28 may be operated. The value of the resistor in switch 26 is different from that in switch 27, which is different from that in switch 28. The capacitor shown in item 25 is common to each individual switch 26, 27 and 28.

By closing any one of switches 26, 27 or 28, the circuit of FIG. 1 and FIG. 2 is placed in operation. Each of switches 26, 27 or 28 functions to cause multivibrator 30 to operate at different output frequencies. Hence, the random nature of the circuit includes a provision enabling the creation of a certain degree of randomness at the very beginning of the operation of the circuit. It is readily apparent, therefore, that increased randomness can be initially created by adding more individual switches. During operation of the circuit, sequential or random operation of the switches 25 may be accomplished manually or electronically in order to vary the frequency of multivibrator 30.

A digital signal is output from multivibrator 30. This signal is then input to one or more counter dividers. In the embodiment illustrated in the figures, two counter dividers 40 and 45 are shown. The output from multivibrator 30 is input to counter divider 40 at clock position 42 and to counter divider 45 at clock position 46. The actual number of counter dividers can vary depending upon the number of output signals that are desired. Counter dividers are, of course, integrated circuits which receive one digital signal and then divides this signal into a number of different signals. Each output signal is of the same state as the input signal and has the same upper and lower values as the input signal. The difference between the input signal and the output signals is the interval between each discrete or discontinuous signal.

In the arrangement of FIG. 1, it is seen that two counter dividers 40 and 45 are used in conjunction with flip flop integrated circuits. A carry out signal from counter divider 45 is the clock input 53 to flip flop 50. Flip flop 50 outputs two signals Q and $\overline{Q}$ at points 51 and 52, respectively. Each signal output therefrom is in exactly the opposite state from the other. Thus, when Q is low, $\overline{Q}$ is high and when $\overline{Q}$ is low, Q is high. The output Q is input into counter divider 45 at its clock enable position 47. Thus, the output signal Q operates to enable signals 1 through 8 to comprise discrete pulses which are output from counter divider 45. The other signal Q output from flip flop 50 is input at the clock position 58 of flip flop 55. This same clock signal is input to counter divider 40 at its clock enable position 41. Therefore, while counter dividers 40 and 45 each receiving the same signal from multivibrator 30, the effective operation of each counter divider is controlled by flip flop 50 such that at one given time either counter divider 40 or counter divider 45 is outputting signals having discrete pulses.

The output signals from counter dividers 40 and 45 are fed into a number of NOR gates. NOR gates 60 are arranged so that any high discrete signal input results in a low output signal. For example, when any signal from either outputs 1, 2 or 5 of counter divider 45 is high, then output signal 13 is low. Then, when all of signals 1, 2 and 5 are low, NOR gate 61 outputs a high signal. In this manner, discrete pulses are output from the NOR gates which pulses have highs and lows of varying duration.

The output signals from NOR gates 60 are then fed into NAND gates 70. In the particular manner utilized in the illustrated embodiment, any low signal to the NAND gates 70 results in a high output signal from the NAND gates 70. So that if NAND gate 71 receives a low signal from either output 16 or 17, then it outputs a high output signal 20. Conversely, when outputs 16 and 17 are both high, then output signal 20 is low. Again, the output at 20 is a signal having discrete pulses with highs and lows of varying durations.

Since the randomness at output 20, 21 and 22 originated with a first degree of randomness at switch 25 which then became more random through the unique utilization of the flip flop circuitry in conjunction with the counter dividers and the NOR and NAND gates, it will be appreciated that a large measure of randomness results at outputs 20, 21 and 22.

Again referring to FIG. 1, it is seen that the output at 56 and 57 is also a high and a low signal which can be designated Q' and $\overline{Q'}$. These signals are of opposite state and are the result of the output 52 from flip flop 50 which is the input to flip flop 55. In FIG. 1, the output 56 and 57 of flip flop 55 terminates at points L' and F'. These points are connected to the points F and L of coils 90 and 100, respectively, of FIG. 2.

The output at 56 is also connected to bilateral switch 80 in FIG. 1. As schematically shown, bilateral switch 80 comprises a number of individual switches 81, 82 and 83. Each of these switches operate in the same manner as follows: Each switch is normally closed. The switch is controlled by a signal from the NAND gate associated with the particular switch. A high signal from the NAND gate causes the switch to open; a low signal causes the switch to close. When the switch is closed, current flows through the switch to the coils. It is to be observed that the signal from the NAND gates is not the current that flows through the switch. It is current from flip flop 55 that flows through the coils. And, since flip flop 55 changes the state of the output signal the current through the switch reverses direction in accordance with operation of flip flop 55. But because of the randomness of the signals from NAND gates 70 and the reversal of the current by flip flop 55, the current flow to the coils is randomly and rapidly turned on and off.

Each of the three coils 90, 100 and 110 schematically shown in FIG. 2 include a primary and secondary winding, which are wrapped around a metal core. Points F', J', A', B' and L' of FIG. 1 are connected to points F, J, A, B and L, respectively, of FIG. 2. Point L is also connected to point K which is one terminal of the primary winding of coil 100. The other terminal I, is connected to point H which is one terminal of the secondary winding of coil 90. The terminal point E of the primary of coil 90 is connected to point D of the secondary of coil 110. Finally, points C of coil 110 and G of coil 90 are commonly connected to point L.

Current at supply voltage is driven through the primary and the secondaries of coils 90, 100 and 110 in accordance with above-stated connections. Most importantly, however, is the fact that the same current is rapidly removed or shut off from the coils because it is this shutting off of the coils that causes the random noise. The above-stated current reversal caused by the operation of flip flop 56 plus the random control signals from the output of the NAND gates 70 which causes the random on and off current flow through the bilateral switch 80, and the primary and secondary windings and their interconnections all contribute to the random noise which is produced.

The position of the coils relative to each other is an important consideration of the noise produced. One coil arrangement that has been determined to be satisfactory comprises a triangular array having sides spaced approximately 4 inches between coils 100 to 110; approximately 3-5/16 inches between coils 90 to 110; and, approximately 3-5/16 inches between coils 90 to 100.

Other important considerations are the number of windings around each core and the size and material of the core. The following is one example which has been found to be satisfactory. In this example, the metal core of each coil comprises a hollow aluminum tube of approximately one-half inch diameter, approximately 0.025 inch wall thickness, and approximately 5-1/2 inches long.

| Coil A: | |
|---|---|
| Primary: | 900 turns of #25 enameled wire on the metal core and having a dc resistance of approximately 5 ohms |
| Secondary: | 560 turns of #28 enameled wire over the primary winding with separation between the layers and having a dc resistance of approximately 8 ohms |
| Coil B and Coil C: | |
| Primary: | 824 turns of #28 enameled wire on the metal core, having a dc resistance of approximately 8 ohms |
| Secondary: | 766 turns of #25 enameled wire over the primary winding with separation between the layers and having a dc resistance of approximately 5 ohms. |

The random noise produced by the coils is as previously stated caused by shutting off the current flow to the windings of the coils. The nature of the noise produced is ultrasonic which is completely above the hearing range of human beings. The noise is produced by the core of the coils which is set into vibration. In a sense, the vibration of the core is somewhat similar to buzzing of a transformer due to the vibrations generated by the core of the transformer. This is not, however, to say that the same noise produced by a buzzing transformer is the same noise produced by the inventive apparatus. The principles are merely similar. For a more complete understanding of the ultrasonic noise produced by vibrating bodies, reference may be had to *Physics* by Hansman and Stack, Fourth Edition, 1958, D. Van Nostrand Company or to *Fundamentals of College Physics* by McCormick, First Edition, 1965, The MacMillian Company, as well as other treatises on the subject.

In the inventive apparatus, the noise produced by one coil begins upon shutting off the current to the primary winding of the coil. This sets the core into vibration producing ultrasonic sounds of varying frequencies. During the very short period of time that the vibration of the core is decaying, the current through the secondary winding of the same coil is continuously turned on and off in accordance with the signals from the NAND gates 70. When this current is shut off, it too causes vibration of the core of the coil. The noise produced by this vibration is superimposed on the noise produced by shutting off the current to the primary windings. In this way, the ultrasonic sound is rapidly and continuously changing. The utilization of three coils in relatively close proximity to each other, each of which is individually experiencing changes of current direction and shutting off the current to its primary and secondary windings causes increased randomness of the effective noise produced by the apparatus.

Various tests of the apparatus have been conducted to determine the effectiveness of the apparatus insofar as destruction of insects and small rodents are concerned as well as to determine the causation, if any, of any adverse effects on the human environment. The effectiveness tests have clearly demonstrated that insects are indeed killed by the apparatus. Flies have been destroyed in a matter of hours. Dead fleas have been found in carpets. A bowling alley has been rid of insects to the extent that it passed health regulations. The effect on fleas is most interesting in that after being exposed to the apparatus and being killed thereby, the flea is no longer hard but may be easily pulverized into dust by a gentle grinding between a person's fingers. To date, no test indicates any substantial adverse effect to the human environment.

While the invention has been described, disclosed and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim:

1. Apparatus for generating random ultrasonic noise comprising
    an electrical power source,
    means for generating at least one digital signal connected to said power source,
    means for dividing said digital signal into a plurality of different digital signals having discrete pulses of varying duration and varying intervals between said pulses, said dividing means being operatively connected to said signal generating means; and
    at least one coil means having a metal core with primary and secondary windings being wrapped around said metal core for producing random high frequency noise said coil means being operatively connected to said dividing means.

2. The apparatus of claim 1, including a switch interposed between said dividing means and said coil means, said switch operatively connecting said electrical power source to said coil means, said switch being controlled by said different digital signals whereby current from said electrical power source transmitted to said coil means is shut off in accordance with said pulses of said different digital signals.

3. The apparatus of claim 2, wherein said means for generating at least one digital signal continuously emits a signal having discrete pulses with a discrete interval between pulses.

4. The apparatus of claim 3, wherein said apparatus continuously emitting said digital signal comprises an astable multivibrator.

5. The apparatus of claim 1, wherein said means for dividing said signal comprises a counter divider emitting a plurality of electrical signals with each signal being pulsed at successively different times whereby the interval between each pulse of each signal is the same but at any given time only one of any of said signals is being pulsed.

6. The apparatus of claim 5, wherein said means for dividing said signal includes a first and a second counter divider, each counter divider being operatively connected to the signal emitted from said generator means and including a first flip flop means for producing a first and second signal of opposite state, said first flip flop means having an input signal comprising one of said plurality of output signals from said first counter divider, said first output signal of said first flip flop means being input into said first counter divider and said second output signal of said first flip flop means being input into said second counter divider, whereby said first and said second counter divider alternately output signals having discrete pulses.

7. The apparatus of claim 6, wherein said means for dividing said signal includes a plurality of OR gates each of said OR gates being operatively connected to one or more signals output from said counter dividers, and a plurality of AND gates, said AND gates being operatively connected to one or more signals output from said OR gates, each AND gate producing one of said plurality of different digital signals.

8. The apparatus of claim 7, wherein said means for dividing said signal includes a second flip flop means, operatively connected to one of said two output signals of said first flip flop means, for producing another first and another second signal of opposite state.

9. The apparatus of claim 8, wherein said coil means comprises three coils each coil having a primary winding and a secondary winding and a metal core, said windings being wrapped around said metal core.

10. The apparatus of claim 9, wherein each of said metal cores comprises a hollow metal tube.

11. The apparatus of claim 10, wherein said coils are arranged in a triangular array with the center-line axis of each tube being parallel to each other and spaced apart from each other by distances of approximately 4 inches, 3 5/16 inches and 3 5/16 inches.

12. The apparatus of claim 9, wherein one output line of said second flip flop is connected to one end of the secondary winging of a first coil, with the other end of said secondary winding being connected to one end of the primary winding of a second coil, said secondary and primary windings being series connected, and the other end of said secondary winding is connected to a first and of the secondary winding of said second coil and to the other output line of said second flip flop, and a first output line from said switch is connected to one end of the secondary winding of a third coil, the other end of said secondary winding of the third coil being connected to one end of the primary winding of said first coil, the other end of the primary winding of said first coil being connected to said first end of the secondary winding of the second coil, the other end of said secondary winding of said second coil being connected to a second output line from said switch, a third output line of said switch being connected to one end of the primary winding of said third coil, the other end of the primary winding of said third coil being connected to said first end of said secondary winding of said second coil.

* * * * *